United States Patent [19]

Kramer, Sr. et al.

[11] 4,308,228
[45] Dec. 29, 1981

[54] METHOD FOR MAKING FLEXIBLE CORRUGATED RUBBER TUBING

[76] Inventors: Vance M. Kramer, Sr., 2341 Townley Rd., Toledo, Ohio 43614; Vance M. Kramer, Jr., 1913 Greendale Ave., Findlay, Ohio 45840

[21] Appl. No.: 190,414

[22] Filed: Sep. 24, 1980

Related U.S. Application Data

[63] Continuation-in-part of Ser. No. 87,512, Oct. 23, 1979, abandoned.

[51] Int. Cl.³ .............................................. B28B 5/00
[52] U.S. Cl. .................................... 264/297; 264/286; 264/320; 264/DIG. 52
[58] Field of Search ............... 264/286, 297, 320, 335, 264/DIG. 52

[56] References Cited

U.S. PATENT DOCUMENTS

| 2,832,096 | 4/1958 | Kramer, Sr. et al. | 425/393 |
| 2,888,712 | 6/1959 | Kramer, Sr. et al. | 425/392 |
| 2,936,812 | 5/1960 | Roberts | 264/DIG. 52 |
| 2,963,750 | 12/1960 | Pavlic | 264/DIG. 52 |
| 4,113,828 | 9/1978 | Kramer, Sr. et al. | 264/320 |
| 4,134,958 | 1/1979 | Dunichev et al. | 264/320 |

Primary Examiner—Donald E. Czaja
Assistant Examiner—W. Thompson
Attorney, Agent, or Firm—Pearne, Gordon, Sessions, McCoy & Granger

[57] ABSTRACT

A method for making flexible tubing with helical corrugations by forming two tube lengths simultaneously while superposed one on top of another. Two extruded sleeves of different diameter formed of uncured vulcanizable stock are slid successively in superposed relation over an elongated internal forming member having a helical surface form with helical ridges and grooves. The resulting assembly is then wrapped with a flexible cord under tension such that successive turns of the cord are in spaced, generally parallel relation and in the grooves of the forming member to press adjacent portions of the two sleeves into the grooves. The sleeves are heat-treated in this wrapped condition to form two flexible, corrugated lengths of tubing simultaneously. The cord is then unwrapped from the lengths of tubing and the lengths are removed in reverse order of assembly.

4 Claims, 4 Drawing Figures

METHOD FOR MAKING FLEXIBLE CORRUGATED RUBBER TUBING

This application is a continuation-in-part of Ser. No. 087,512 filed Oct. 23, 1979, now abandoned.

BACKGROUND OF THE INVENTION

This invention relates to helically corrugated, flexible tubing, especially rubber tubing of the type disclosed in U.S. Pat. No. 2,832,096. More particularly, the invention relates to a method for making such flexible, corrugated tubing and especially to a novel variation of the method of U.S. Pat. No. 2,832,096 of Vance M. Kramer et al, sometimes referred to as the "cording" method.

As disclosed in U.S. Pat. No. 2,832,096, helically corrugated tubing may be made by first drawing an extruded sleeve of uncured rubber axially over an elongated, rotatable mandrel with a core strip wrapped around it to form a single, continuous, external thread. The uncured rubber sleeve is forced into the helical groove or root of the thread by a length of cord wrapped around the sleeve to impart a desired corrugated shape. The rubber sleeve is cured in this condition and the cord removed. After curing, the resulting hose length may be removed from the mandrel and the core strip in a number of ways, such as by being blown off by air pressure between the mandrel and the cured tube, as described in U.S. Pat. No. 2,888,712.

The resulting helically corrugated hose length is both flexible and strong, yet still maintains its tubular form in a semi-rigid condition. This type of hose has particular application for use in domestic and industrial vacuum cleaners, as engine exhaust tubing, or tubing for ventilation systems, as well as in other appropriate applications.

In practice, tube lengths of many different diameters are made to satisfy market demand, and in the past it has been necessary to have a mandrel of a specific size for each of the various sizes of tube to be manufactured. Because of the time required in the "cording" and "uncording" steps of the process, considerable time is utilized in forming the extruded sleeve before curing, and in preparing the cured tube length for removal from the mandrel.

The method of the present invention, however, provides a novel variation on the basic "cording" process by which two tube lengths may be corded, cured, and and uncorded at the same time, thus eliminating entirely the "cording," "curing," and "uncording" process for one of the two tube lengths being manufactured.

SUMMARY OF THE INVENTION

It is among the objects of the invention to increase productivity in the manufacture of flexible, corrugated rubber tubing using the "cording" process.

Another object of the invention is to reduce the time required per tube length for the "cording," "curing," and "uncording" steps of the process in the maufacture of flexible corrugated tubing.

These and other objects and advantages are achieved by the novel method of the invention, which makes possible the manufacture of two flexible, corrugated lengths of tubing simultaneously by the steps of (1) telescoping a first extruded sleeve of vulcanizable stock over an elongated, internal forming member having a helical surface formed with a helical ridge and groove;

(2) telescoping a second extruded sleeve of vulcanizable stock over the first extruded sleeve;

(3) wrapping a flexible element about the sleeves under tension with successive turns in spaced, generally parallel relation and in the helical groove of the internal forming member to press adjacent portions of the superposed sleeves into the groove of the internal forming member in superposed relation;

(4) heat treating the sleeves while in the wrapped, superposed condition to form a first flexible currugated tube length of relatively small diameter and a second flexible corrugated tube length of relatively large diameter;

(5) unwrapping the flexible element from the tube lengths; and separating the tube lengths from each other and from the internal forming member.

DESCRIPTION OF THE PREFERRED EMBODIMENT

Figure 1:
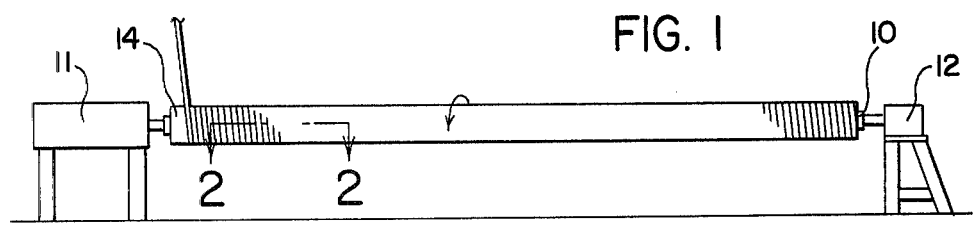
FIG. 1 is an elevational view showing two extruded sleeves of vulcanizable stock of different diameters positioned on a helical forming member and being wrapped from end to end with a cord in accordance with the method of the invention.

Referring more particularly to the drawings, FIG. 1 diagrammatically illustrates an apparatus for performing the method of the invention. In accordance with the method, two flexible lengths of corrugated tubing are formed simultaneously from two extruded sleeves of vulcanizable stock using the basic "cording" method such as shown in U.S. Pat. No. 2,832,096. The sleeves are preferably composed of natural or synthetic rubber or rubberlike material, the term "rubber" being used herein to include such materials.

Figure 2:
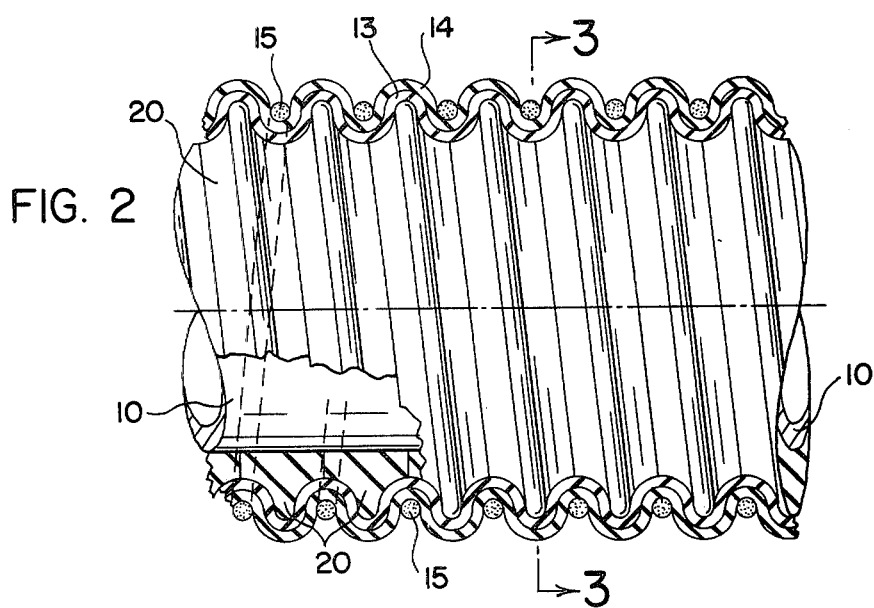
FIG. 2 is a fragmentary, sectional view on an enlarged scale, taken on the line 2—2 of FIG. 1.

FIG. 1 shows a tubular mandrel or forming member 10 mounted at one end in a rotary support 11 that supplies the rotary drive and at the other end in a removable idling rotary support 12. A first extruded sleeve 13 (see FIGS. 2, 3 and 4) of vulcanizable stock is positioned over the forming member 10 and, immediately thereafter, a second extruded sleeve 14 of vulcanizable stock is slid axially over the first sleeve 13. Then, a cord 15 is wrapped around the assembly to press the extruded sleeves 13 and 14 into a helical groove on the forming member, as illustrated in FIG. 2. This procedure is illustrated and described in greater detail in U.S. Pat. No. 2,832,096. When the assembly has been generaly formed as in FIGS. 2 and 3, the forming member 10, together with the sleeves 13 and 14 and cord 15, are removed from the rotary supports 11 and 12 and placed in a curing oven.

Figure 3:
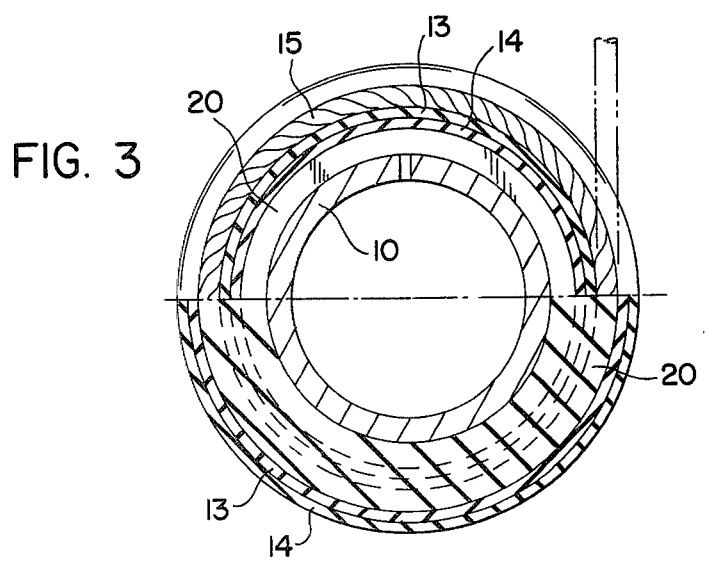
FIG. 3 is a fragmentary, sectional view, drawn to the same scale as FIG. 1 and taken on the line 3—3 of FIG. 2.

The helical thread of the forming member 10 for the extruded sleeves 13 and 14 may be formed by wrapping a core strip 20, FIGS. 2 and 3, of relatively hard, flexible rubber around a mandrel to define a single thread of uniform pitch. The core strip 20 has a central ridge that forms the helical crest of the thread and its sides abut one another to define the helical root.

Figure 4:
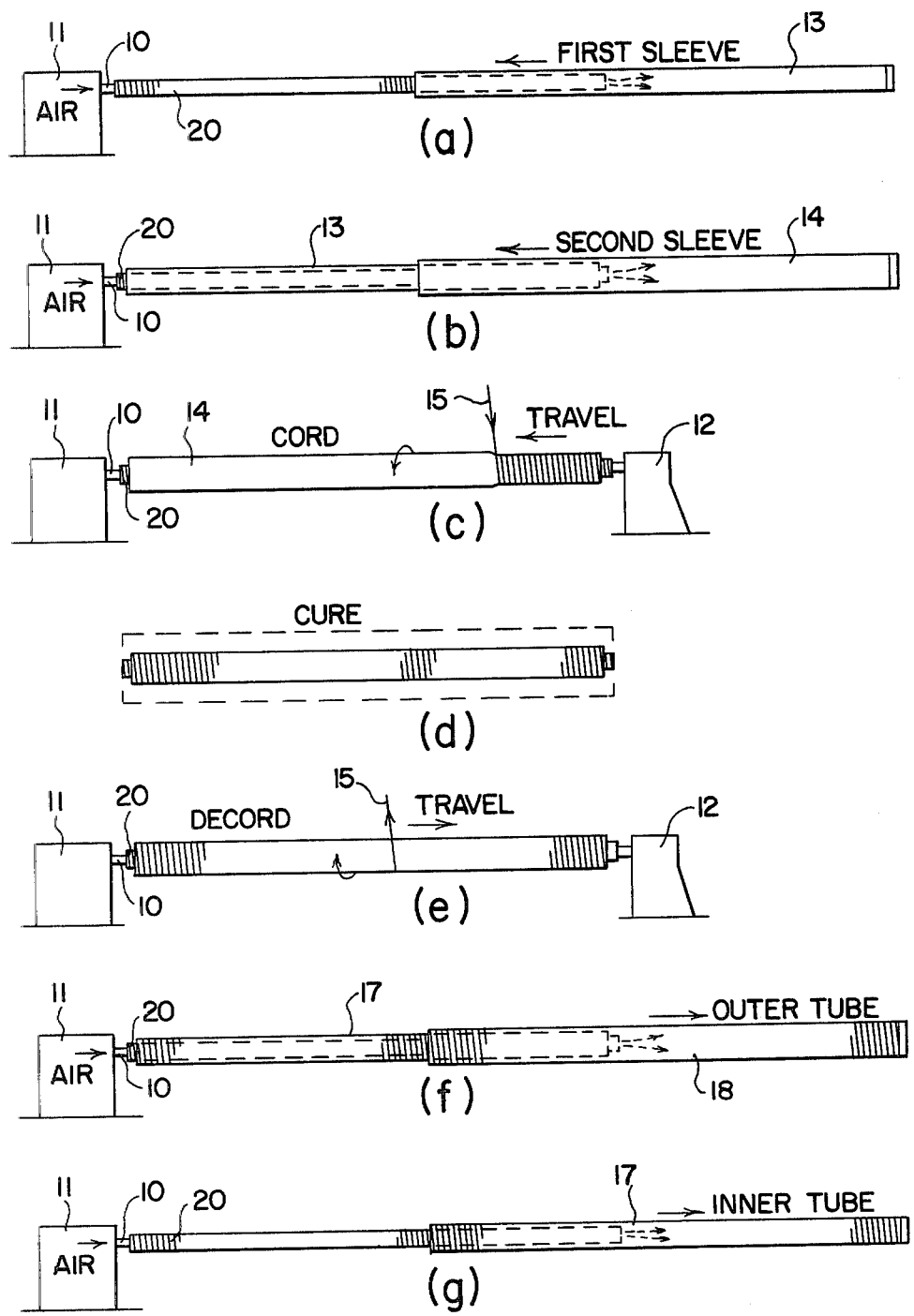
FIG. 4 is a series of elevational views, including views (a) through (g), which illustrate in somewhat diagrammatic form the sequential steps of the method of the invention.

The procedure for forming the flexible hose lengths is illustrated sequentially in FIG. 4. As shown in FIG. 4(a), it will be seen that the first extruded sleeve 13 of vulcanizable stock is slid axially over the assembled mandrel 10 and core strip 20. As described in said U.S. Pat. No. 2,832,096, a lubricant such as soapstone or a liquid silicone solution may be applied to the core strip 20 or the interior of the sleeve 13, or both, to facilitate sliding the sleeve over the wrapped mandrel. When the sleeve 13 is in place, the second extruded sleeve 14 of extruded stock, having a larger diameter than the sleeve 13, is slid axially across the sleeve 13, utilizing a lubricant as before and air under pressure to facilitate the axial movement. It will be noted that during the positioning of the sleeves 13 and 14, the forming member 10 is supported in cantilever fashion by the rotary support 11 and air under pressure to facilitate the sliding of the sleeves in an axial direction may be supplied through the rotary support 11.

When the first sleeve 13 is properly positioned on the forming member, the second sleeve 14, which is of larger diameter (preferably having an internal diameter just slightly larger than the external diameter of the sleeve 13), is slid in an axial direction over the sleeve 13, again using air under pressure as indicated in FIG. 4(b), and also using a lubricant as described above.

Once the sleeves 13 and 14 are assembled in superposed relation, as shown in FIGS. 4(a) and 4(b), a cord 15 is wrapped around the sleeves as indicated in FIG. 4(c). The cord is wrapped under tension with successive turns thereof in spaced, parallel relation and located in alignment with the helical groove of the forming member to press adjacent portions of the sleeves 13 and 14 into the groove in superposed relation, as best shown in FIGS. 2 and 3. During the wrapping or "cording" process, the outer end of the mandrel 10 is placed in the idling rotary support 12 and the mandrel is rotated to wind or wrap the cord in the desired fashion.

Once the wrapping is completed, the tail end of the cord is secured to the mandrel and the resulting assembly is removed from the rotary supports 11 and 12 and placed in a curing oven (FIG. 4(d)).

In the curing of the tubing, the tightly wound cord 15 maintains compressive radial forces on the sleeves and, in effect, forms an external mold which confines the rubber during curing. The softening of the rubber sleeves by the curing heat causes the rubber to flow into and take the shape of the helical groove formed in the mandrel assembly. The curing of the rubber while thus confined by the cord results in the formation of two lengths of corrugated rubber tubing simultaneously.

After the assembly comprising the cured tubes 17 and 18 is removed from the heat treating oven and cooled, the assembly is placed with the ends of the mandrel 10 supported by the rotary supports 11 and 12 and the mandrel is rotated while the cord 15 is unwrapped from the assembly, as illustrated in FIG. 4(e). When the unwrapping is completed, the outer corrugated tube 18 formed from the sleeve 14, is removed from the inner tube 17, formed from the sleeve 13, with the assistance of air under pressure that is supplied through the mandrel 10 to the space between the inner surface of the outer tube 18 and the outer surface of the inner tube 17. It will be noted that the idling rotary support 12 is removed from the assembly during the unloading process and the mandrel 10 is supported in cantilever fashion from the rotary support 11. Once the outer tube is removed, air under pressure is supplied to the space between the outer surface of the mandrel 10 and the inner surface of the inner tube 17, and the inner tube is slid axially off the mandrel.

It will be noted that by utilizing the method described, two lengths of corrugated tubing are produced during approximately the same time period that would be required for the production of only one length of tubing in accordance with prior art practices. The only additional time is required by the loading and unloading of the outer sleeve and outer corrugated tube. In other words, the production time required to make a flexible corrugated length of tubing is reduced almost 50% as compared to prior practice by using the method of the invention.

While the method of the invention has been illustrated and described with respect to a specific embodiment thereof, this is intended for the purpose of illustration rather than limitation, and other variations and modifications of the specific method herein shown and described will be apparent to those skilled in the art, all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. A method for making flexible tubing with helical corrugations comprising telescoping a first uncured rubber sleeve over an elongated internal forming member having a surface formed with helical ridges and grooves; telescoping a second uncured rubber sleeve over said first uncured rubber sleeve; wrapping a flexible element about said sleeves under tension with successive turns of said element in spaced, generally parallel relation and in alignment with the helical groove of said internal forming member to press adjacent portions of said sleeves into the groove of said internal forming member in superposed relation; heat treating said sleeves while in said wrapped superposed condition, to form a first flexible corrugated tube length of relatively small diameter and a second flexible corrugated tube length of relatively large diameter; unwrapping said flexible element from said tube lengths; and separating said tube lengths from each other and from the forming member.

2. A method according to claim 1 wherein the forming member is produced by wrapping a core strip around a support member, the core strip being composed of rubber, the core strip being wound around the support in the form of a continuous helix, the core strip substantially completely enclosing and covering said support and defining an outwardly directed corrugated surface comprising a continuous helical ridge and a continuous groove.

3. A method according to claim 1 including the step of supplying lubricant to contacting surfaces of the forming member and the first sleeve and the contacting surfaces of the first and second sleeves before wrapping said sleeves with said flexible element.

4. A method according to any of claims 1, 2 or 3, including the steps of introducing air under pressure between said first and second tube lengths and simultaneously sliding said second tube length axially from said first tube length; and introducing air under pressure between said forming member and said first tube length and simultaneously sliding said first tube length axially from said internal forming member.

* * * * *